RANDOM ACCESS HIGH SPEED MEMORY

Filed March 1, 1962 6 Sheets-Sheet 1

INVENTOR.
RICHARD L. SNYDER,
BY
Walter J. Adam
ATTORNEY.

RANDOM ACCESS HIGH SPEED MEMORY

Filed March 1, 1962 6 Sheets-Sheet 2

INVENTOR.
RICHARD L. SNYDER
BY
Walter J. Adam
ATTORNEY.

Dec. 8, 1964 R. L. SNYDER 3,160,864

RANDOM ACCESS HIGH SPEED MEMORY

Filed March 1, 1962 6 Sheets-Sheet 3

INVENTOR.
RICHARD L. SNYDER,
BY
Walter J. Adam
ATTORNEY.

INVENTOR.
RICHARD L. SNYDER,
BY Walter J. Odom
ATTORNEY.

INVENTOR.
RICHARD L. SNYDER,
BY
Walter J. Adam
ATTORNEY.

Dec. 8, 1964 R. L. SNYDER 3,160,864

RANDOM ACCESS HIGH SPEED MEMORY

Filed March 1, 1962 6 Sheets-Sheet 6

INVENTORS.
RICHARD L. SNYDER,
BY
Walter J. Adam
ATTORNEY.

United States Patent Office 3,160,864
Patented Dec. 8, 1964

3,160,864

RANDOM ACCESS HIGH SPEED MEMORY

Richard L. Snyder, Malibu, Calif., assignor to Hughes Aircraft Company, Culver City, Calif., a corporation of Delaware Filed Mar. 1, 1962, Ser. No. 176,677
10 Claims. (Cl. 340—174)

This invention relates to high speed computer memories and particularly to a simplified and improved thin film random access memory operable at relatively high speeds.

There exists a need in the computer field for very high speed random access memories. The switching speed of conventional core memories is limited both by the material of the cores and by the relatively long conductors providing propagation delays in transmitting electrical signals. Furthermore, in very fast switching applications, ferrite cores have such large cross sections that the flux content requires excessive switching voltages. Memory cores composed of thin films have the advantage of switching with relatively small voltages and power. Also, thin film cores may have highly oriented magnetic elements or dipoles arranged with magnetic elements in a preferable alignment, and can be switched in a rotational mode by a combination of perpendicular fields with one of the fields being of the same polarity during switching in either magnetic direction. Because this unidirectional field can be used to interrogate the cores without switching, non-destructive reading can be accomplished with thin film cores.

One of the major problems of prior art thin film memories is the lack of a core that will accommodate a closed magnetic path. As a result, the thin film cores have open magnetic circuits so that the cores must be spaced at relatively great distances apart to minimize interaction of the radiated fields. Thus, the conventional thin film memories are large and require long conductors resulting in relatively slow operation. Also, conventional thin film memories may require a plurality of coil arrangements and are relatively difficult to construct.

It is therefore an object of this invention to provide a simplified and reliable high speed digital memory that is easily constructed.

It is a further object of this invention to provide a high speed memory utilizing thin films of magnetic material arranged to provide essentially a closed magnetic path.

It is another object of this invention to provide a highly compact thin film memory array that has a high speed of operation, a low power requirement and a high degree of reliability.

It is still another object of this invention to provide an improved thin film memory element in which the thin film is deposited on a circular conductor with magnetic elements in the film oriented parallel to the axis of the circular conductor.

Briefly, in accordance with this invention, a memory array is provided with conductors each coated with a thin film of oriented magnetic material having magnetic dipole elements aligned parallel to each other in a substantially stable manner. The coated wires are arranged in complementary pairs on an insulated conducting plate to provide word wires. The direction of orientation is parallel to the axis of the substrate conductor. Groups of sense and control conductors for respectively performing the function of writing and sensing are wound around the plate at substantially right angles to the direction of the coated wires and between the pairs of coated wires with each group establishing a magnetic domain in each pair of the coated wires. There is thus established an essentially closed magnetic loop in the path through the complementary coated wires on either side of the sense and control conductors at each magnetic domain and through the relatively short air space between the wires. Shield plates are placed on the outside of the plated wires to confine the fields of the sense and control conductors. During reading, a selection or bias current is passed through each of a pair of the coated word wires and so distorts and reduces the flux linking the sense wire that a small voltage is generated therein. The polarity of the stored bits determines the polarity of the induced sense signal. This operation is non-destructive in the sense that the collapse of the exciting current permits the system to return to its initial state. When writing is desired, the control conductors are energized with one polarity or the other during the presence of the bias or interrogating field resulting from the bias current. The combination of the two fields causes the very rapid rotational switching mentioned above. Because of the closed magnetic path of the thin films on the two adjacent coated wires the magnetic field is retained allowing close spacing and short conductors to provide a high speed memory.

The novel features which are believed to be characteristic of the invention, both as to its organization and method of operation, together with further objects and advantages thereof, will be better understood from the following description considered in connection with the accompanying drawing, in which like characters refer to like parts, and in which.

Figures 1, 4, 8:
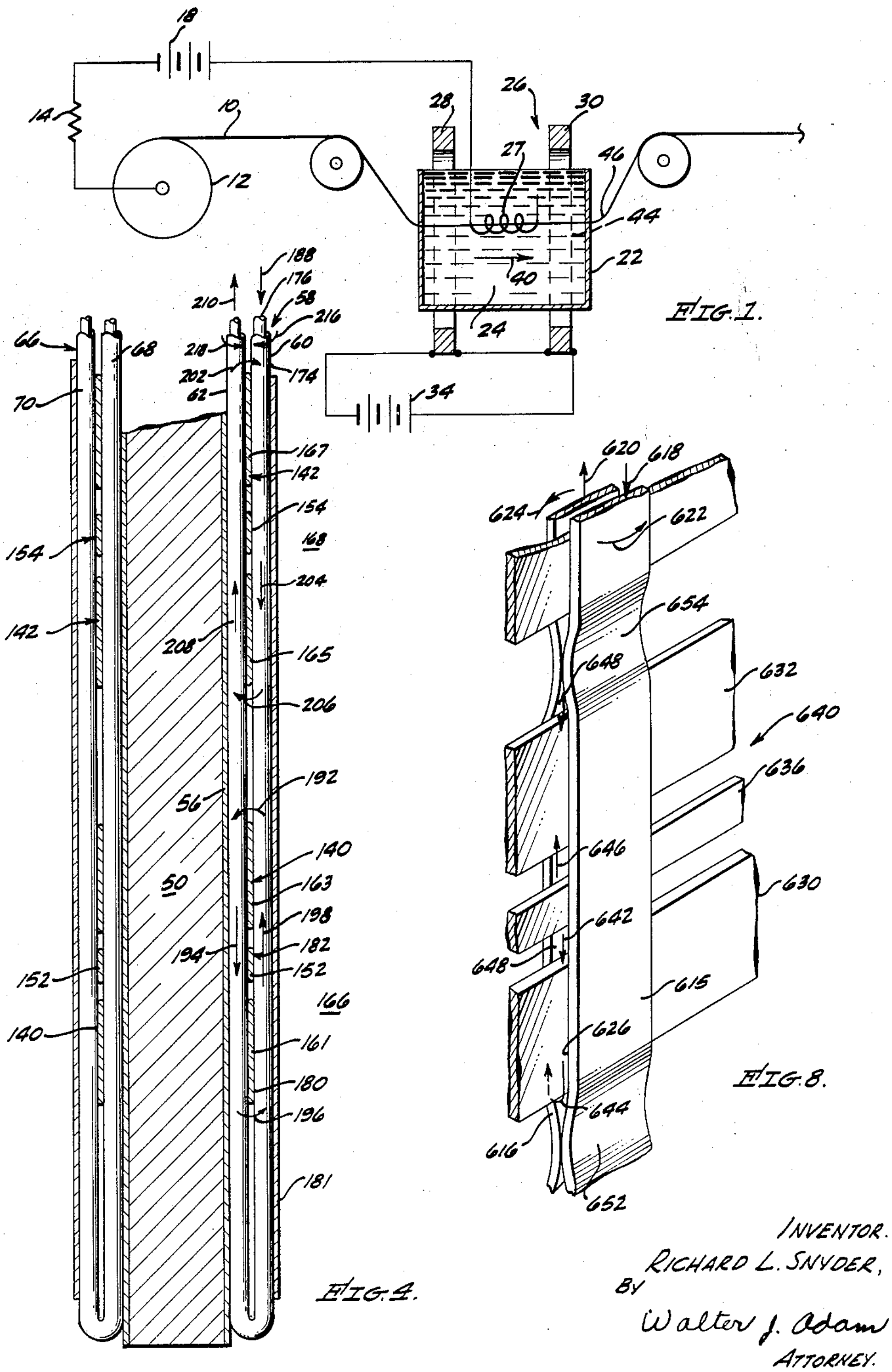
FIG. 1 is a schematic view showing an arrangement for forming the coated conductors or wires in accordance with this invention having magnetic elements in the magnetic coating material linearly oriented parallel to the axis of the wire or conductor.
FIG. 4 is a schematic sectional view taken at lines 4—4 of the memory array of FIG. 2 for further explaining the arrangement of the coated wires and conductors utilized therein in accordance with this invention.
FIG. 8 is a schematic perspective diagram of another arrangement of the memory elements in accordance with this invention.

Referring first to FIG. 1, the formation of the coated or plated word wires utilized in the memory arrays in accordance with this invention will be explained. A wire 10 of a conducting material such as copper wound on a spool 12 is coupled at one end through a current limiting resistor 14 to the negative terminal of a source of potential such as a battery 18. The wire 10 is first cleaned in an acid bath, for example (not shown), and passed through a tank 22 containing a plating bath or electrolyte solution 24 which may contain iron and nickel molecules and other elements. An anode 27 is immersed in the electrolyte solution 24 and coupled to the other terminal of the battery 18. It is to be noted that the wire 10 forms the cathode of the plating bath. In order to orient the magnetic elements or dipoles of the coating of magnetic iron nickel material deposited on the wire 10 in the tank 22, a magnetic field generated by a current in a suitable coil arrangement such as Helmholtz coils 26 having separate ring coils 28 and 30 is positioned around the tank 22. The coils 28 and 30 may have wires wound around a core with the wires coupled in series between the terminals of a suitable source of potential such as a battery 34. As is well known in the art, the Helmholtz coils 26 provide a magnetic field indicated by an arrow 40 that is essentially parallel to a longitudinal axis 44 of the coils 26. During the electro-depositing operation in the tank 22, a thin film 46 of magnetic material is formed on the wire 10 with a linear orientation of magnetic dipoles or elements parallel to the longitudinal axis of the wire 10. The thin film of magnetic material may be better seen by a film 174 in FIG. 4. By magnetic orientation is meant that after formation and in the absence of an external magnetic field, the magnetic material is so formed that relatively large amounts thereof will carry flux in one direction parallel to the direction of orientation. Only the most minute part of the material which may form walls between domains magnetized in opposite directions will have magnetic moments divergent from the direction of orientation. Such a film after formation may have many domains which can be shifted into a single domain by an externally magneto-motive force applied parallel to the direction of orientation of the material. A film magnetized as a single domain may be disturbed by an external field applied in the direction at right angles to the direction of orientation. If this cross field or bias field does not become as great as the coercive force in the direction at right angles to the direction of orientation, the removal thereof will permit the material to return to its initial state. The application of a field which opposes the magnetization of a film in the presence of a cross field causes rotational switching. This type of reversal of magnetization can be extremely fast being completed in less than $10^{-9}$ sec.

When thin films are formed on fine wires and oriented parallel to the axis of the wires in accordance with this invention, the cross field is established by passing current through the wire. Such a current produces a circumferential field which distorts the flux that enclose the sense and control conductors (FIG. 2) generating a voltage therein. The cross field also prepares the film for switching by applying a field which may be produced by the passage of current through the control conductors. Films on other coated wires as may be seen in FIG. 2 having no cross field but subject to switching fields will not be permanently disturbed if the duration of the switching field is limited to less than $5\times10^{-8}$ sec. With the oriented thin film, if the direction of alignment is changed by an external field, the magnetic elements will return to their direction of desired alignment when the external field is removed or when the external field is removed and an aligned or oriented field is then applied. The magnetic dipoles or elements deposited on the wire 10 in the field of the coil 26 thus inherently have a condition of least energy when aligned in the oriented direction parallel to the axis 44. The linear orientation of the film 46 is required for coherent and reliable switching of the material and for the non-destructive reading operation.

The wire 10 may then be passed from the coating tank 22 to other washing tanks (not shown). Because the deposition potentials of $Ni^{++}$ and $Fe^{++}$ are relatively close together, both metals are simultaneously deposited on the copper wire 10 with approximately 80% nickel and 20% iron. The temperature of the solution 40 may be held at approximately 50 degrees centigrade, for example. For the solution 24 a composition that has been found to be satisfactory includes per liter of solution, two normal $NiSO_4\cdot6H_2O$, one-half normal solution of $MgSO_4\cdot7H_2O$, half normal $H_3BO_3$ and a grain of saccharine to relieve tensions. To this solution is added $FeSO_4\cdot7H_2O$ in varying amounts to maintain a selected plating ratio of 80:20, NiFe ratio. The plating is carried out with a current density of 1 to 1.5 amperes/(decimeters)$^2$ at a pH value of 2.5 to 4.

Figures 2, 3:
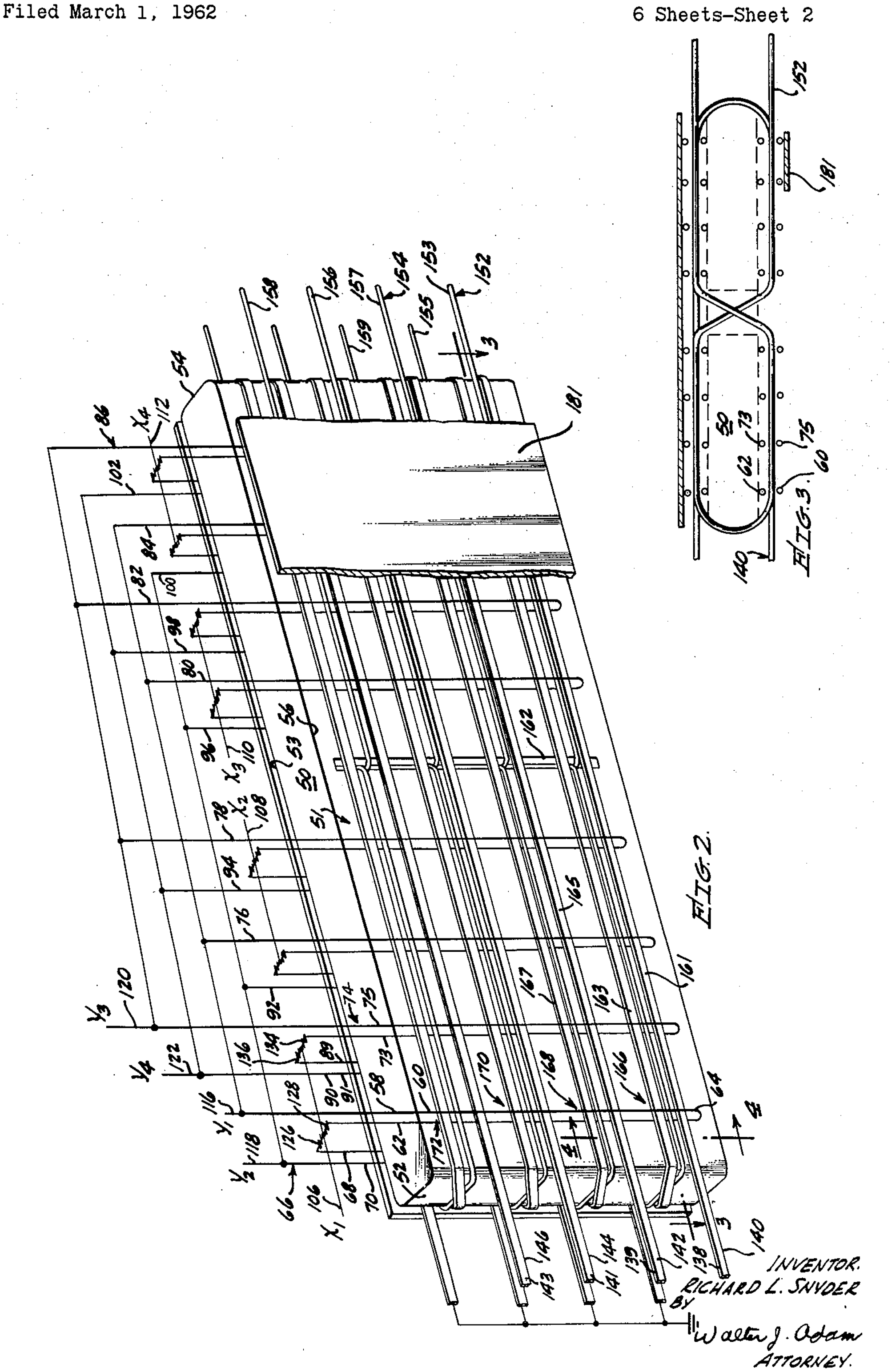
FIG. 2 is a schematic perspective drawing of the high speed memory array in accordance with this invention.
FIG. 3 is a schematic sectional view taken at lines 3—3 of the memory array of FIG. 2 showing the arrangement of the coated wires and conductors utilized therein in accordance with this invention.

Now that the formation of the wire coated with a thin film of linear oriented magnetic material has been explained, the improved memory array in accordance with this invention as shown in FIG. 2 will be described. A rectangular plate 50 which may be of aluminum is provided with rounded ends 52 and 54. To insulate the surface of the plate 50, an anodized surface 56 may be provided by well known anodizing techniques. Each word shown containing four binary bits for purposes of illustration is stored in the magnetic coating of a pair of coated wires placed adjacent to each other such as a coated wire 58 having a first vertical wire segment or outer segment 60 and a second vertical wire segment or inner segment 62 being continuous and bent over at 64. It is to be noted that also within the principles of this invention, the wire segments 60 and 62 may be separate wires with the conductive center joined at 64. On the opposite side of the plate 50 and similarly arranged is a coated wire 66 having first and second vertical segments 68 and 70 forming a four bit word storage element. On the same side of the plate 50 as the wire 58 are similarly arranged coated wires 74, 76, 78, 80, 82, 84 and 86 each having two vertical segments such as 73 and 75 of the wire 74. Also arranged in a similar manner on the same side of the plate 50 as the coated wire 66 are coated wires 90, 92, 94, 96, 98, 100 and 102 each having two vertical wire segments such as 89 and 91 of the wire 90. Thus, the two parallel portions of each coated wire form a word and the illustrated memory array includes 16 words each containing four binary bits as will be explained subsequently in more detail.

Selection of a word for interrogation and for writing is performed by energizing an X selecting lead 106, 108, 110 or 112 respectively designated $X_1$, $X_2$, $X_3$ and $X_4$ and a Y selection lead 116, 118, 120 or 122 respectively designated $Y_1$, $Y_2$, $Y_3$ and $Y_4$. The $X_1$ selection lead 106 is coupled through the cathode to anode paths of diodes 126 and 128 to the central conductor of the segments 62 and 68 of respective coated wires 58 and 66 and through the cathode to anode paths of diodes 134 and 136 to the central conductor of respective inner segments 73 and 89 of coated wires 74 and 90. In a similar manner the $X_2$ selection lead 108 is coupled through diodes to the central conductors of the inner segments of the wires 76, 92, 78 and 94, the $X_3$ selection lead 110 is coupled through diodes to the central conductor of the inner segments of coated wires 80, 96, 82 and 98 and the $X_4$ selection lead 112 is coupled through diodes to the central conductor of the inner segments of coated wires 84, 100, 86 and 102. The $Y_1$ selection lead 116 is coupled to central conductor of the outer wire segment 60 of the coated wire 58 and to the outer segments of the coated wires 76, 80 and 84. The $Y_2$ selection lead 118 is coupled to the central conductor of the outer segment 70 of the coated wire 66 and to the outer segments of the coated wires 92, 96 and 100 and the $Y_3$ selection lead 120 is coupled to the central conductor of the segment 75 of the coated wire 74 and to the central conductor of the outer segments of the coated wires 78, 82 and 86. Similarly, the $Y_4$ selection lead 122 is coupled to the central conductor of the segment 91 of the coated wire 90 and to the central conductor of the outer segments of the coated wires 94, 98 and 102.

For establishing the magnetic domains in the coated wires, control or write conductors 140, 142, 144 and 146 are wound between the two vertical segments of the coated wires. The write conductors such as 140 are wound first around the side 51 of the plate 50, around the side 53, around the side 51 and again around the side 53 passing between the two vertical segments of each coated wire. A spacing may be provided between each write conductor such as 140 and 142 so that the magnetic domains established in the coated wires are separated from each other. The write conductors 140, 142, 144 and 146 have respective ends 138, 139, 141 and 143 which may be coupled to a source of write pulses (FIG. 6) with the other end thereof coupled to ground.

Figure 6:
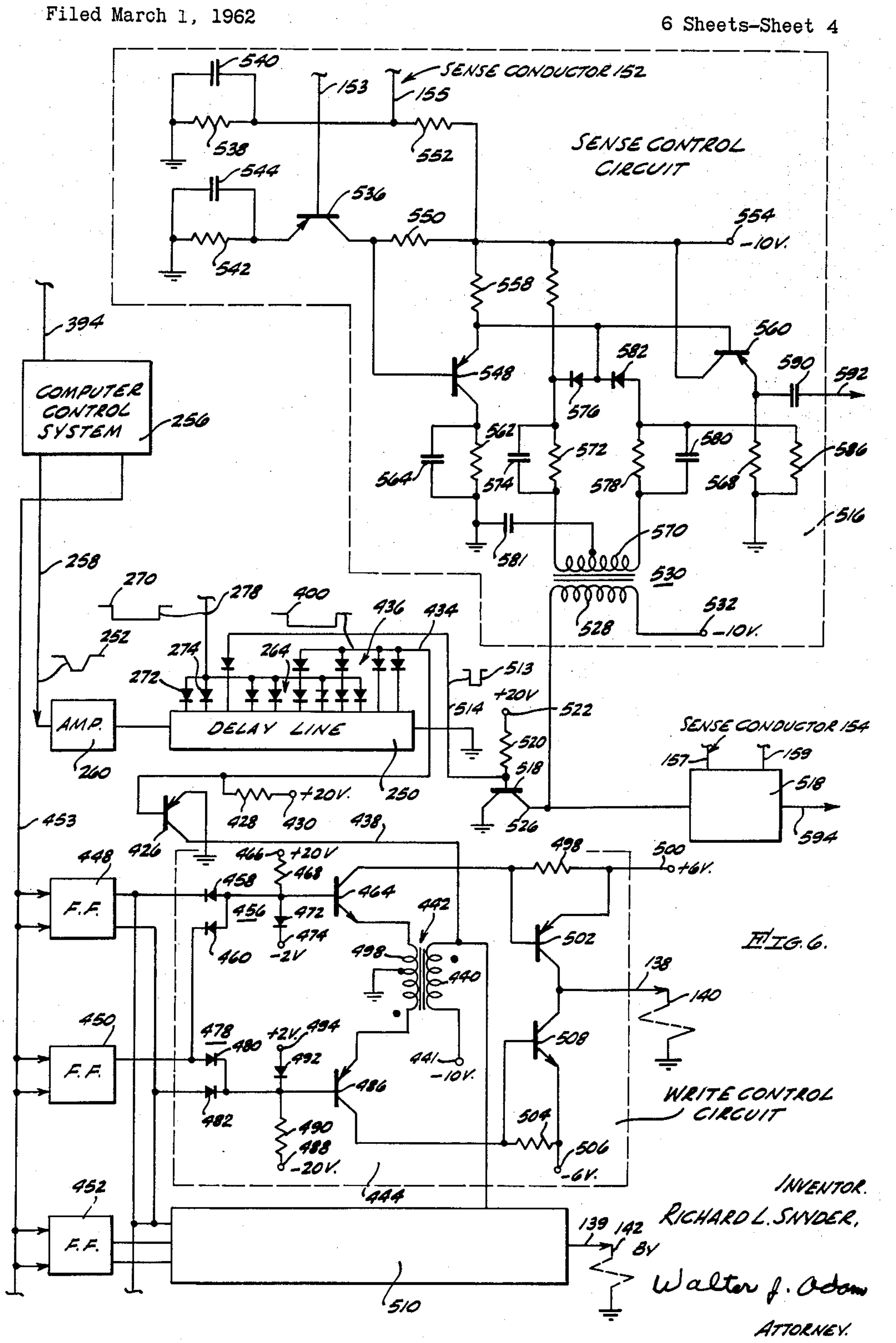
FIG. 6 is a schematic circuit diagram of the reading and writing circuits in accordance with this invention that may be utilized with the memory array of FIG. 2.

Sense conductors 152, 154, 156 and 158 are wound between the two passes of respective write conductors 140, 142, 144 and 146 and between the two wire segments of each coated wire such as 58. In order to cancel signals induced in the sense conductors during writing, each sense conductor such as 152 is wound through a slot 162 in a figure eight fashion. It is to be noted that the write conductors such as 140 may pass over the write conductor 152 at the end 52, for example, so that the sense conductor 152 is maintained between the two windings of the write conductor 140 in the regions of each of the coated wires such as 58. The sense conductors such as 152 and 154 respectively have ends 153 and 155 and ends 157 and 159 which are coupled to a sense and amplifying circuit (FIG. 6). In each segment of the coated wires such as 58, regions or magnetic domains such as 166, 168, 170 and 172 are established by the write conductors, as will be discussed in more detail subsequently. At each domain region such as 166 and 168, the write conductors such as 140 and 142 may respectively include portions 161, 163 and portions 165 and 167. Plates such as 181 having an anodized surface are positioned on each side of the plate 50 adjacent to the coated wires to confine the fields of the sense and write conductors.

Referring now also to FIG. 3, the sense conductor 152 and the write conductor 140 is shown in a section taken at line 3—3 of FIG. 2. Signals induced in the sense conductor 152 by current flowing through the write conductor 140 are effectively cancelled in the sense lead 152. Referring now to FIG. 4 which is a section taken at line 4—4 of FIG. 2 for further explaining the memory array, the anodized surface 56 of the plate 50 provides electrical insulation and some limiting of lines of flux. The coated wire segments 60 and 62 of the coated wire 58, for example, are shown with a thin film coating 174 thereon and a central conductor 176. The portions 161 and 163 of the write conductor 140 pass between the segments 60 and 62 with the sense conductor 152 therebetween. The write conductors such as the portions 161 and 163 and the sense wire 152 have insulation 180 and 182 thereon which may be a conventional synthetic lacquer coating, for example. The write conductors such as 140 and the sense conductors such as 152 may be wires or flat strips as shown within the principles of the invention. The flat strips have the advantage that the wire segments such as 60 and 62 are closely spaced to provide a highly closed magnetic path as will be explained subsequently. The ribbon or strip conductors such as the write conductor 140 and the sense conductor 152 may be formed from circular wires flattened to the desired approximately rectangular shape with the insulation retained thereon. Each domain region such as 166 is established by current flowing through the write conductor portions such as 161 and 163 in the presence of a bias field resulting from current flowing through the conductor 176 of the coated wire segments 60 and 62. The current flowing through the central conductor 176 of the coated wire 58 is the bias current and may be in either direction such as the direction shown by an arrow 188 for disturbing the magnetic field in the domain 166 so that writing may be performed. It is to be noted that the wire segments 60 and 62 may also be arranged to pass current in parallel in the same direction in accordance with this invention. Because of the arrangement of the write conductor 140, current flows in the same direction through the segments 161 and 163 with the direction being selected to store a first or a second binary state in the magnetic film 174. When current flows down through the cut portions of the segments 161 and 163, a magnetized state is established in the magnetic film 174 of the coated wire segments 60 and 62 as shown by arrows 192, 194, 196 and 198. The entire circumference of the circular conductor segments 60 and 62 is magnetized with the magnetic path passing from the segment 60 to the segment 62 through the relatively small airspace as shown by the arrow 192 and the magnetic path passing from the segment 62 to the segment 60 as shown by the arrow 196. The small airspace provides a low reluctance compared to adjacent coated wires such as 74 (FIG. 2) so that the magnetic field has a primary path in the magnetic film 174 in the two adjacent or complementary wire segments 60 and 62. Thus, the magnetic domain 166 has essentially a closed magnetic loop and the flux is substantially contained in the magnetic material so that coated wires such as 74 and 76 (FIG. 2) may be closely spaced resulting in very short sense and write conductors. The length of the domain 166 is established by the write conductor portions 161 and 163 with the flux leaving the ends of the domain to jump the space between the coating of the segments 60 and 62. The length of a required magnetic domain along the coated wire 58 has been found to be less than one-eighth of an inch with one-sixteenth of an inch spacing between two domain regions such as 166 and 168.

In a similar manner, the domain 168 may be established with the magnetic field shown by arrows 202, 204, 206 and 208 illustrated in the opposite direction as a result of current flowing out from the cut edge of the write conductor portions 165 and 167 of the write conductor 142. The stored magnetic states of the domains 166 and 168 as shown may respectively represent a binary one and a binary zero. However any binary combinations may be stored in the domain regions of a word.

The type of high speed switching utilized in the system in accordance with this invention is to apply a short current pulse to develop a reversing field in the presence of a somewhat weaker circumferential bias field at right angles to the direction of alignment or orientation of the magnetic dipole elements and in the plane of the film. Because the film such as 174 has magnetic elements thereof linearly oriented parallel to the axis of the circular conductor 176, the circumferential bias field resulting from current flowing through the central conductor 176 is at right angles to the direction of alignment of the magnetic dipole elements. The bias field is thus developed by the current flowing through the central conductor such as 176 of the coated wires and the reversed field is developed by the current flowing in a selected direction through the write conductor such as 140. Under these conditions it is believed that the magnetic moments start to precess because of the cross or circumferential bias field. This precession is then continued by the switching field until a complete reversal is accomplished which is terminated in a damped oscillation. If only the cross field or bias field is present, some distortion is caused, but in the absence of a reversal field, a permanent change in the field is not produced. The collapse of the bias field will permit the material to resume its initial magnetic state. Also, if the reversing pulse occurs in the absence of the bias field and is of sufficiently short duration, there will be some disturbance of the magnetic particles which will be too small to produce a permanent change, and the magnetic elements will snap back to their original condition. Only when both the bias field and the reversing or writing field are present will reversal occur, which switching is in a time of less than $10^{-9}$ seconds. These characteristics exist for magnetic fields having amplitudes of the same order as the coercivities of the materials. Another characteristic of the rotational switching mode in accordance with this invention is that of non-destructive sensing of the magnetic polarity existing in a core by subjecting the material to only the circumferential bias field. The magnetic disturbance caused by the resultant partial rotation of the magnetic molecules or elements induces a voltage in the sense conductor such as 152 having a polarity dependent on the polarity of magnetization of the core. When the bias field is removed, the magnetic material returns to the original magnetic state.

During writing, in which a write pulse of a selected polarity is applied to a write lead such as 140 in the presence of a bias field, the circumferential bias field established by current flowing through the conducting wire 176 of the segments 60 and 62 may be in either direction as the stored magnetic field such as in the domains 166 and 168 only need to be disturbed to allow the write current in a selected direction to change the magnetic state or to maintain the stored magnetic state. In the example shown, bias current may flow through the central conductor 176 of the segments 60 and 62 as shown by the arrow 188 and an arrow 210 and the bias field has a direction shown by arrows 216 and 218. The sense output is produced with the same polarity by interrogate current of either polarity.

Reading of the stored binary states is performed by applying the bias current of the arrows 188 and 210 flowing through the central conductor 176 with the circular field of the arrows 216 and 218 distorting the fields in the domains of the coated wires such as the domains 166 and 168. This distortion temporarily diminishes the flux linking the sense conductors such as 152 and 154 to generate a voltage in each. Consequently, the polarity of this generated voltage is only determined by the polarity of the field stored in each domain and may, for example, be a positive voltage in the sense conductor 152 for the "one" stored in the magnetic domain 166 and a negative voltage in the sense conductor 154 for the zero stored in the magnetic domain 168. As will be discussed subsequently, the voltage pulses developed in the sense conductors are then applied to sense amplifiers. Because the interrogate or read pulse applied to the selected central conductor 176 of the segments 60 and 62 is relatively short in duration, the stored magnetic fields return to their initial state at termination of the read pulse. Thus, the stored information is non-destructively read in accordance with this invention and a recirculation loop is not required to maintain stored information during reading.

Because the wire diameter of the central conductor 176 is small, the magnetic path of the arrows 216 and 218 is short and a very small bias or selection current is required as shown by the arrows 188 and 210. It is to be noted that during writing, either a "zero" or a "one" may be written because selection of a word is performed by the bias field of the coated wire and writing current is passed through the write conductors in a selected direction.

Thus, the arrangement in accordance with this invention, having an essentially closed magnetic path, allows utilization of relatively short sense conductors resulting from close spacing of adjacent coated wires for a given memory size so that the propagation delay of signals along the conductors as related to the speed of light does not limit the speed of operation. Because of the relatively short length of coated wires such as 58, the propagation delay of the bias current is very small. Also, as discussed previously, if many bits are desired per word, the current may be passed through the central conductors of the complementary wire segments such as 60 and 62 in parallel because the direction of the bias currents is arbitrary, thus shortening the propagation delay of the bias signals. The write conductors are also relatively short because of the close spacing of the coated wires so as to minimize propagation delays during writing. The linearly oriented thin film such as 174 allows switching with a bias field in approximately $10^{-9}$ seconds. If the coated wires such as the segments 60 and 62 are of a 1 mil diameter and have a 4 mil spacing between centers such as between the coated wires 58 and 74, then for each inch along the sense conductors 250 words are stored. It has been found that approximately 20 inches of sense lead may be utilized without propagation delay substantially affecting the speed of reading. The length of the coated wire is relatively short so propagation delays of the bias pulse are very small. Thus, the system stores 5,000 words per sense line without propagation delay problems during reading. If 50 bits are utilized per word instead of the four illustrated, then 250,000 bits may be stored in the memory in accordance with the principles of this invention without appreciable propagation delays. Also, short conductors provide a low inductance to further minimize delay.

The writing conductors such as 140 are shown in FIG. 2 to be formed by two turns such as 161 and 163 of flat wire. The resulting length may cause troublesome delays in very large memories. For this reason, in large memories these writing conductors are formed by two loops connected in parallel. It should be noted that even in a 5,000 word memory constructed in accordance with this invention, the series connection does not increase the operation time by more than four nanoseconds which is small compared to the limitations imposed by present day control devices.

Also, in accordance with this invention, the coated wires may be positioned along the plate 50 in a very close arrangement such as one mil diameter wires spaced with 2 mils distance between centers in the direction along the sense leads. For the 20 inch length of sense conductors, this provides 10,000 words for the sense line and for a 50 bit per word system, a 500,000 bit, high speed memory is provided. The pairs of coated wires which essentially encircle the writing conductors provide complementary flux paths which insure a minimum reluctance for the flux in the system. When two or more pairs of wires are in close proximity such as segments 60, 62, 73 and 75 of FIG. 3 in which each pair may be oppositely magnetized, they have essentially no influence on the direction of flux on each other because flux may pass from the segment 62 to the segment 73 and back to the segment 60 so that an essentially constant flux is maintained in the coated wires of each pair. The magnetic coupling between two pairs of coated wires storing magnetic fields of the same polarity may be slightly less than two adjacent pairs magnetized in opposite senses but the difference is relatively small because the path of magnetic flux closure at the air space has not been appreciably changed. These conditions apply when the spacing between complementary segments of a coated wire is approximately equal to the space between the pairs of coated wires such as 58 and 74 along the sense conductor.

Figure 5:
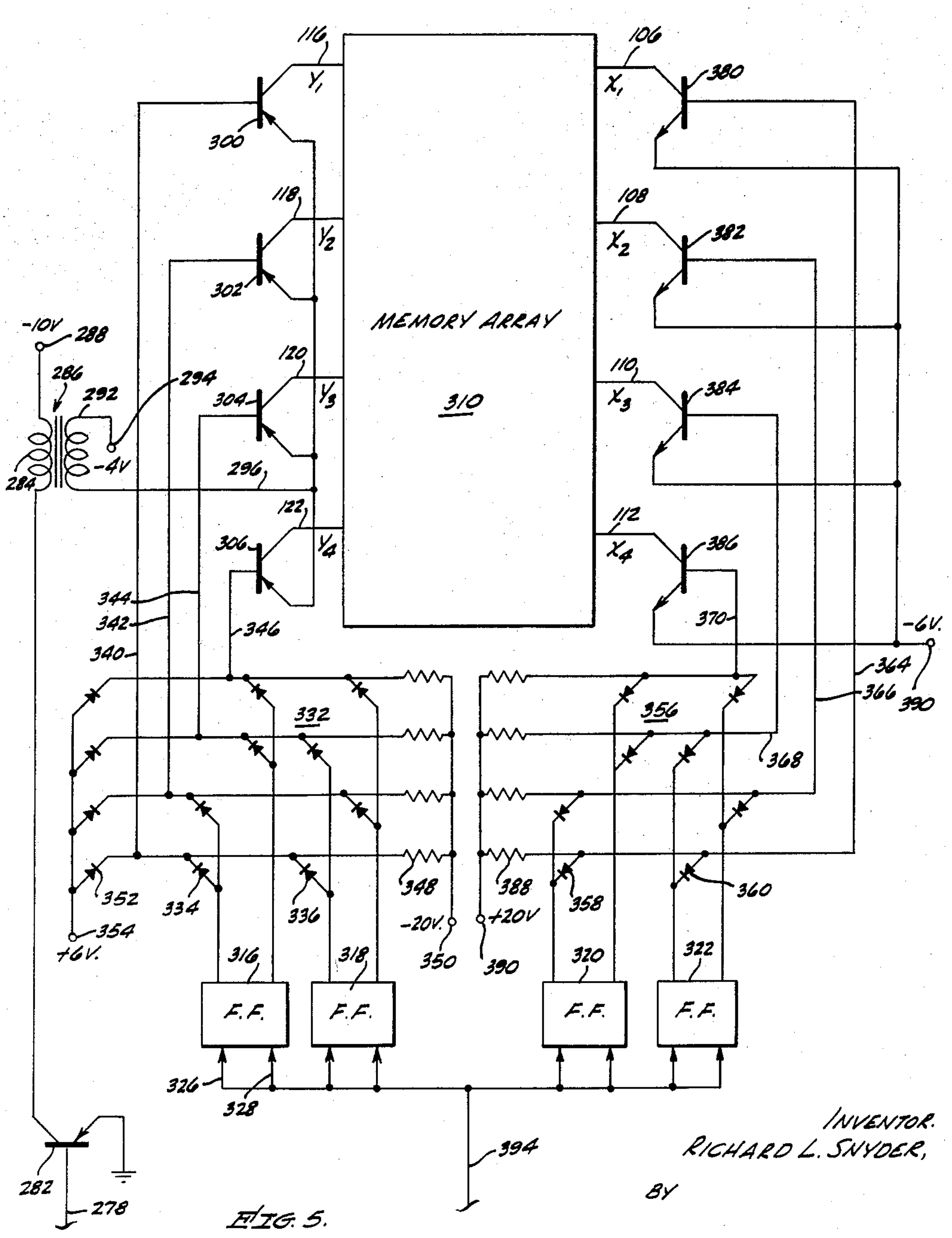
FIG. 5 is a schematic circuit diagram of an addressing arrangement in accordance with this invention that may be utilized with the memory array of FIG. 2.

Now that the reading and writing operation of the binary storage regions have been generally described, the selection circuitry for applying the reading or interrogation pulses to the central conductors of selected coated wires will be described. Referring to the addressing arrangement of FIG. 5 and to reading and writing arrangement of FIG. 6, the memory system of FIG. 2 may be timed by properly terminated delay line 250 responsive to an initiate pulse of a waveform 252 applied from the timing circuitry of a computer control system 256, for example, through a lead 258 and an amplifier 260 to the delay line 250. The delay line 250 may, for example, include a length of coaxial cable. Because pulses longer than the initiate pulse are required, multiple taps are coupled to the delay line 250 whose outputs are combined in diode "or" gates such as 264. As the read timing pulse of a waveform 270 is relatively long, a plurality of diodes such as 272 and 274 form the "or" gate 264 coupled to a lead 278 which in turn is coupled to a base of a p-n-p type inverting transistor 282 (FIG. 5). The transistor 282 has an emitter coupled to ground and a collector coupled through a winding 284 of a transformer 286 to a −10 volt terminal 288. A second winding 292 of the transformer 286 has one end coupled to a −4 volt terminal 294 and the other end coupled to a lead 296 which in turn is coupled to the emitters of a plurality of Y driver transistors 300, 302, 304, and 306, all of the p-n-p type. The driver transistors 300, 302, 304 and 306 respectively have collectors coupled to the Y selection leads 116, 118, 120 and 122 as shown in FIG. 2 and which are coupled to a memory array 310 representing the memory arrangement of FIG. 2, for example.

For addressing selected words of the memory system of FIG. 2, a first pair of address register flip flops 316 and 318 and a second pair of address register flip flops 320 and 322 are provided to form an address register, each with a first and second input lead such as 326 and 328. The output signals of the flip flops 316 and 318 which may be any of four combinations of "zeros" and "ones," that is, low or high voltages, are applied to a conventional diode "and" gate matrix 332. Diodes such as 334 and 336 are included in the matrix 332 and arranged so that each binary combination stored in the flip flops 316 and 318 causes a low voltage signal to be formed on only one of output leads 340, 342, 344 or 346 which in turn are respectively coupled to the bases of Y driver transistors 300, 302, 304 and 306. Each of the leads 340, 342, 344 and 346 is coupled at one end through resistors such as 348 to a −20 volt terminal 350. Clamping diodes such as 352 are coupled between a +6 volt terminal 354 and the leads 340, 342, 344 and 346 to clamp all leads except the selected one at +6 volts. Because the diode logical selection circuit 332 is well known in the art, it will not be explained in further detail.

The binary combinations stored in the flip flops 320 and 322 also control a diode selection circuit 356 having diodes such as 358 and 360 arranged similar to the logical circuit 332, except reversed in polarity. The signals applied to the logical circuit 356 form a high voltage signal on a selected one of leads 364, 366, 368 or 370 respectively coupled to the bases of n-p-n type X driver transistors 380, 382, 384 and 386. The leads 364, 366, 368 and 370 are coupled through resistors such as 388 to a +20 volt terminal 390, which as is well known in the art, allows a positive signal to be applied to the selected lead. The Y driver transistors 380, 382, 384 and 386 have emitters coupled to a −6 volt terminal 390 and have collectors respectively coupled to the X selection leads 106, 108, 110 and 112 which in turn are coupled to the memory array 310.

The above described address circuits pass current through through the X and Y selection conductors such as 106 and 116 and through the central conductors of the coated wire such as 58 in a selected word of the memory system of FIG. 2 for non-destructive reading as well as during writing. For example, applying a negative pulse to the base of the transistor 300 and to the base of the transistor 380 passes current through the lead 116, the central conductor of the coated wire 58, through the diode 128 and through the lead 106 between the potential of a timing pulse applied to the lead 296 in response to the read pulse of the waveform 270 and the −6 volts of the terminal 390. Combinations of binary address signals are applied to the input leads of the flip flops 316, 318, 320 and 322 through a plurality of leads indicated as a composite lead 394 from the computer control system 256.

For responding to write timing pulses of a waveform 400, a p-n-p type transistor 426 has an emitter coupled to ground and a base coupled through a biasing resistor 428 to a +20 volt source of potential 430 and through a lead 434 to an "or" gate 436 coupled to the delay line 250. The "or" gate 436 forms the write pulse of relatively long duration of the waveform 400. The collector of the transistor 426 is coupled through a lead 438 to one end of a first winding 440 of a transformer 442 included in a write control circuit 444. The other end of the winding 440 is coupled to a −10 volt terminal 441.

The write control circuit 444 is controlled by the signal on the lead 438 similar to the waveform 400 except inverted and shown by a waveform 610 (FIG. 7), by a write control flip flop 448 and by a digit register flip flop 450. Other write control circuits such as 510 are provided, with one for each of the four bit positions of the words stored in the memory array of FIG. 2. Thus, one digit register flip flop such as 450 or 452 is provided for each write conductor 140, 142, 144 and 146 of FIG. 2. The control flip flop 448 and digit register flip flops such as 450 and 452 are set to selected binary states by information applied thereto as shown by a waveform 455 (FIG. 7) from the computer control system 256 through leads indicated as a composite lead 453. A first "and" gate 456 includes a diode 458 having a cathode coupled to the control flip flop 448 and a diode 460 having a cathode coupled to the digit register flip flop 450 for writing into the first digit position of the selected word in the memory array 310. The anodes of the diodes 458 and 460 are coupled to the base of an n-p-n type transistor 464 and to a +20 volt terminal 466 through a resistor 468 as well as through the anode to cathode path of a diode 472 to a −2 volt terminal 474. A second "and" gate 478 includes a diode 480 having an anode coupled to the single output of the digit register flip flop 450 and a diode 482 having an anode coupled to the other output of the control flip-flop 448. The cathodes of the diodes 480 and 482 are coupled to the base of a p-n-p type transistor 486 as well as to a −20 volt terminal 488 through a resistor 490. The cathodes of the diodes 480 and 482 are also coupled through the cathode to anode path of a diode 492 to a +2 volt terminal 494. A second winding 498 of the transformer 442 having a grounded center tap is coupled between the emitters of the transistors 464 and 486. The collector of the transistor 464 is coupled through a biasing resistor 498 to a +6 volt terminal 500 and to the base of a p-n-p type transistor 502 having an emitter coupled to the terminal 500. The collector of the transistor 486 is coupled through a resistor 504 to a −6 volt terminal 506 as well as to the base of an n-p-n type transistor 508 having an emitter coupled to the −6 volt terminal 506. The collectors of the transistors 502 and 508 are coupled to the end 138 of the write conductor 140 which in turn has the other end coupled to ground as shown in FIG. 2 for passing writing current of a waveform 147 (FIG. 7) therethrough.

The second write control circuit 510 is responsive to the digit register flip flop 452, to the write timing signal of the waveform 610 (FIG. 7) on the lead 438 and to the control signal of the write control flip flop 448 to apply writing pulses to the end 139 of the write conductor 142. It is to be noted that additional write control circuits are provided for each write control conductor 144 and 146 of FIG. 2, but are not shown for convenience of illustration.

Thus, when a positive signal is applied to the cathode of the diode 458, which permits writing, and a positive signal is applied to the cathode of the diode 460, the transistors 464 and 502 are biased into conduction in response to a timing pulse of a waveform 610 (FIG. 7) applied to the lead 438, to apply a positive writing pulse of the waveform 147 (FIG. 7) to the write conductor 140. When a negative signal is applied to the anode of the diode 482, that is, to permit writing, and a negative signal is applied to the anode of the diode 480 from the digit register flip flop 450, then the transistors 486 and 508 are biased into conduction in response to the timing pulse of the waveform 610 (FIG. 7) to apply a negative writing pulse to the write conductor 142 having a duration of the write timing pulse of the waveform 610. When writing is not desired, the control flip flop 448 is set to the opposite state and a negative signal is applied to the cathode of the diode 458 and a positive signal is applied to the anode of the diode 482 so that information stored in the flip flop 450 is not passed through the "and" gates 456 and 478.

It is to be noted that writing is performed in a word conductor or wire through which a selection or bias current of the waveform 602 (FIG. 7) is passed simultaneously with a write current pulse such as shown by the waveform 147 (FIG. 7) passed through the write conductor.

For reading, a strobe signal of a waveform 513 applied from the delay line 250 to a lead 514 provides timing to sense control circuits such as 516 and 518. The lead 514 is coupled to the base of a p-n-p type transistor 518 which is biased through a resistor 520 to a +20 volt terminal 522. The emitter of the transistor 518 is coupled to ground and the collector is coupled to a lead 526 which in turn is coupled to a first winding 528 of a transformer 530 in the sense control circuit 516 as well as to other sense control circuits such as 518. The other end of the winding 528 is coupled to a −10 volt terminal 532.

The end 153 of the sense conductor 152 applies a sensed binary signal during reading from the first bit position to the base of a p-n-p type transistor 536 of a two state amplifier arrangement. The end 155 of the sense conductor 152 is coupled through a parallel arranged resistor 538 and by-pass capacitor 540 to ground. The emitter of the transistor 536 is coupled to ground through a parallel arranged resistor 542 and by-pass capacitor 544. The collector of the transistor 536 is coupled to the base of a p-n-p type transistor 548 forming the second stage of the amplifier as well as through biasing resistors 550 and 552 to the resistor 538. The resistor 550 is also coupled to a source of −10 volt potential 554. The transistor 548 has an emitter coupled through a biasing resistor 558 to the −10 volt terminal 554 and coupled to the base of a p-n-p type transistor 560 operating as an emitter follower. The collector of the transistor 548 is coupled through a parallel arranged biasing resistor 562 and capacitor 564 to ground. The collector of the emitter follower transistor 560 is coupled to the −10 volt terminal 554 and the emitter is coupled through a resistor 568 to ground.

The strobe pulse of a waveform 557 (FIG. 7) applied to the winding 528 of the transformer 530 develops a pulse in a second winding 570 which has a first end coupled through a parallel arranged resistor 572 and capacitor 574 to the cathode of a diode 576 included in a strobe gate. The second end of the winding 570 is coupled through a parallel arranged resistor 578 and capacitor 580 to the anode of a diode 582 forming the other half of the strobe gate. The anode of the diode 576 and the cathode of the diode 582 are jointly coupled to the base of the transistor 560. Also, for proper biasing, the anode of the diode 582 is coupled to ground through a resistor 586. In order that the strobe gate including the diodes 576 and 582 returns to the same D.C. level when opened and closed, a capacitor 581 is coupled between a center tap of the winding 570 and ground.

A sensed and amplified output signal of a first or a second polarity is applied from the emitter of the transistor 560 through a coupling capacitor 590 to a lead 592 to be utilized for arithmetic operations in the computer control system 256, for example. The sense control circuit 516 responds to a positive strobe pulse of the waveform 557 applied to the transformer 530 on the lead 526, to bias the diodes 576 and 582 out of normal conduction. Thus, a positive or negative sensed signal of the waveform 155 (FIG. 7) on the lead 224 is amplified by biasing the transistors 536 and 548 so as to vary the conduction of the transistor 560 to apply a positive or a negative signal to the lead 592 which may respectively represent a "one" or a "zero."

It is to be noted that the signals representing the sensed signal of the second bit position of a selected word are applied at the ends 157 and 159 of the sense conductor 154 (FIG. 2) to the sense control circuit 518, which in turn in response to the strobe signal on the lead 526 of the waveform 557 (FIG. 7) applies a binary signal to the computer system 256 through the lead 594. Similar sense control circuits are provided for the sense conductor of each bit position of the memory array of FIG. 2 but are not shown for convenience of illustration.

Referring now to the waveforms of FIG. 7 as well as to FIGS. 2, 5 and 6, the operation of the memory system in accordance with the invention will be explained in further detail. At time $T_0$ as determined by circuits in the computer control system 256 address pulses such as shown by waveforms 596 and 598 are applied to each of the address register flip flops 316 and 318 of the address register, which flip flops are triggered to a binary state to select an address lead such as the lead 340. When a low level signal is applied from the flip flops 316 and 318 on the output leads coupled to the cathodes of the diodes 334 and 336, a negative pulse (not shown) is applied to the lead 340 to be maintained until the flip flops 316 and 318 are triggered to another combination. The Y driver transistor 300 is thus biased into a ready state. Also, at time $T_1$ address input pulses similar to waveforms 596 and 598 are applied to the flip flops 320 and 322 to select a lead such as 364 by applying low level output voltages to the anode of the diodes 358 and 360. Thus, a high level signal is formed on the lead 364 and maintained until the flip flops 320 and 322 are triggered to another binary state. Therefore, the X driver transistor 380 is biased to a ready state. The driver transistors 300 and 380 are thus selected to pass current through the central conductor of the coated wire 58 storing the binary bits of the selected word when a read pulse is applied to the emitter of the transistor 300.

At time $T_1$, the read pulse of the waveform 270 is applied to the lead 278 to bias the transistor 282 into conduction to apply a positive pulse to the lead 296 from the transformer 286. A positive pulse similar to the waveform 270 except inverted is thus applied to the emitter of the transistor 300. Because only the driver transistors 300 and 380 have pulses applied to the bases, only those two selected transistors are biased into conduction. Thus, read current of a waveform 602 flows through the central conductor of the coated wire 58 to form a circular or circumferential bias field for reading and for writing if desired, from the magnetic domains stored in the magnetic material on the surface of the coated wire 58. It is to be noted that the read current of the waveform 602 which develops the bias field may flow in either direction without changing the polarity of the sensed signal but in the arrangement shown always flows in the same direction.

Shortly after time $T_1$ as the linearly oriented magnetic elements or dipoles of each core are rotated, a sensed signal of the waveform 155 is induced on the sense conductor such as 152 and 154 being positive for a stored "one" and negative for a stored "zero," for example. The sense signal is induced in the sense conductor as the circumferential or peripheral bias field applied to the film at right angles to the direction of orientation disturbs the magnetic elements and decreases the flux density in the field linking the sense conductor. Similar signals are formed on the sense conductors 156 and 158 representing the previously stored information of the third and fourth bit positions of the selected word.

The sensed signal of the waveform 155 is applied to the base of the transistor 536 of the sense control circuit 516. Thus, the signal of the waveform 155 is amplified and applied through the second amplifying stage of the transistor 548 to the base of the emitter follower transistor 560. Because of a small delay of the sensed signal between the lead 153 and the base of the transistor 560, a strobe pulse of the wave form 557 developed from the pulse of the waveform 513 (FIG. 6) is applied to the transformer 530 at time $T_3$ as determined by the tap points of the delay line 250. The sensed pulse of the waveform 155 may terminate at approximately time $T_2$. Thus, the diodes 576 and 582 of the strobe gate are biased out of conduction shortly after time $T_3$ and the amplified signal similar to the waveform 155 is effective to control the transistor 560 to apply a positive or negative signal to the lead 592 and to the computer control system 256. The signal applied to the lead 592 may be similar to the waveform 155 except amplified with the polarity being positive or negative as determined by the polarity of a sensed signal 603 or 604 representing respectively a "one" or a "zero." The operation of the other sense control circuits such as 518 are similar except responding to the stored binary state in the second bit of the selected word through sense conductor 154, for example, to apply a positive or a negative signal to the lead 594 and to the computer control system 256. It is to be noted that because the sense conductors are wound in a figure eight fashion as shown in FIG. 3, the same relevant polarity relation in different parts of the memory array are reversed to represent a "zero" or a "one." Thus, the computer control system 256 may have this change or polarity included in the logic thereof and respond to the section of the random access memory array that is addressed.

Now that the address register flip flops 316, 318, 320 and 322 have been set to the binary combination to address the selected word and a bias current is passing through the central conductor of a selected coated wire such as 58, the write cycle may be performed if desired. As discussed previously, the thin film of magnetic material in each coated conductor will return to an initial state upon removal of the bias current. Thus, the system in accordance with this invention may operate with nondestructive read out. However, if writing is desired, a write current pulse of the waveform 147 is applied to each of the write conductors 140, 142, 144 and 146 at time $T_4$, with a positive pulse representing a "one" and a negative pulse representing a "zero," for example. Writing is performed in response to the control flip flop 448 and the write timing pulse of the waveform 610 on the lead 438. Any desired binary combination may be written into the cores of the four bit positions of the word selected by the continuing bias force developed by current flowing through the central portion of the selected coated wire 58. It is to be noted that the memory array of FIG. 2 may include any desired number of words and binary bits per word, being shown with 16 four bit words for convenience of illustration.

Writing during this cycle is selected when the write control flip flop 448 has been triggered to a selected binary state in response to a control signal similar to the waveform 455 applied from the computer control system 256, such as at a time $T_3$, so that a pulse of a positive polarity is applied to the cathode of the diode 458 and a pulse of a negative polarity is applied to the anode of the diode 482, effectively energizing the gates 456 and 478. Also, at the time $T_3$, binary write information such as shown by the waveform 455 is applied to the write flip flops such as 450 which are triggered to a first or a second state depending on the polarity of the input signals. When the flip flop 450 is triggered to a state so that a voltage of a positive polarity is applied to the cathode of the diode 460, a positive signal is applied to the base of the transistor 464. As a result, the transistor 464 is biased into a ready state so as to conduct shortly after application of a write timing pulse of the waveform 610 applied to the lead 438. Also, in response to the voltage signal of positive polarity applied from the flip flop 450 to the anode of the diode 480, the "and" gate 478 is not opened and the transistor 486 is not biased to a state for conduction. In response to the pulse of the waveform 610 energizing the transformer 442 at time $T_4$ or shortly thereafter and applying a negative signal to the emitter of the transistor 464 and a positive signal to the emitter of the transistor 486, the transistor 464 is biased into conduction. The transistor 464 in turn applies a signal to the base of the transistor 502 to bias that transistor into conduction. Thus, for example, the positive current pulse of the waveform 147 representing a binary "one" is applied through the transistor 502 and through the write conductor 140 to ground.

Because the circumferential bias force of the arrows 216 and 218 of FIG. 4 is maintained on the coated wire of only the selected word, the current pulse of the waveform 147 in each write conductor such as 140 writes into only the one domain. Also, current pulses similar to the waveform 147 applied to write conductors 142, 144 and 146 write into only the domains of the selected coated wire 58. If a "one" is stored in the domain 166 of the first bit position, a positive current pulse of the waveform 147 representing a "one" maintains the magnetic material of the domain region 166 saturated and the films of magnetic material remains at the condition of the stored state at the termination of the pulse. If a "zero" is stored in the domain region 166, the positive current pulse of the waveform 147 representing a "one" drives the magnetic film to the opposite state or "one" state. Information is written into the domain region 166 in a similar but opposite manner when a negative current pulse of the waveform 147 shown dotted to represent a "zero" is applied to the write conductors such as 140.

When the flip flop 450 is triggered to a state so that a signal of a low voltage is applied to the cathode of the diode 460 and to the anode of the diode 480, the "and" gate 478 is biased into conduction and the negative current pulse of the waveform 147 is applied to the write conductor 140 representing a "zero." It is to be noted that a similar writing operation is simultaneously performed by the write control circuit 510 in response to the write information stored in the flip flop 452 by passing a selected positive or negative current pulse through the write conductor 142, with the domain regions such as 168 having the circumferential bias force impressed thereon. A similar arrangement is provided for the other two domain regions of each word by passing a positive or negative current pulse through the write conductors 144 and 146 in response to another write flip flops and circuits (not shown) similar to the write control circuits 444 and 510.

Thus, because in the memory of FIG. 2 only the selected word has a bias field applied thereto, only the bits of the selected word are permanently affected by the writing current. The domain regions of all unseletced words in the memory array do not permanently change state in response to the writing current pulse such as of the waveform 147 which is of a relatively short duration. When the read current of the waveform 602 is removed shortly before time $T_5$, a signal such as 605 of the waveform 155 developed on the sense conductors is not utilized.

The application of the writing current pulse of the waveform 147 is completed at a time $T_5$ and a short period until a time $T_0'$ is provided for circuit recovery such as discharge of capacitors therein. The next cycle of operation may be started at time $T_0'$ with the read and write operation similar to that discussed above, selecting a word at time $T_0'$ to pass a bias current through the central conductor of the selected coated wire representing the selected word, applying a read current pulse of the waveform 602 through the central leads at time $T_1'$ and applying a strobe pulse of the waveform 557 to the sense control circuits at time $T_3'$. If writing is desired, that is, a destructive cycle, then new information is written into the selected word at time $T_4'$. Because of the delay line timing arrangement, the memory of the invention may be utilized with non-synchronous operation, that is, the time $T_0'$ of a cycle may be started whenever desired after completion of the previous cycle, in response to the initiate pulse of the waveform 252 applied to the lead 258 from the computer control system 256, for example. It is to be noted that because of the essentially closed loop magnetic path and because the arrangement of the plate 50, memory elements are closely spaced without one pair of cores affecting another when changing state. It is to be noted that the adjacent pairs of coated wires in FIG. 2 may be closely spaced and are only shown spaced a relatively large distance apart along the axis of the sense conductor for convenience of illustration.

It has been found that for a domain region ⅛ inch long along the axis of the coated conductor, that a 30–40 milliampere bias current of the waveform 602 (FIG. 7) and a 0.5 ampere write current of the waveform 147 is adequate. With this arrangement, the sense signal of the waveform 155 (FIG. 7) is 0.5 milliwatt.

As an example of the short period of time required for a read write cycle in the high speed memory system in accordance with this invention, if time $T_0$ is zero time, time $T_1$ may be at 15 nanoseconds, time $T_2$ may be 30 nanoseconds, time $T_3$ may be 40 nanoseconds, time $T_5$ may be at approximately 60 nanoseconds, time $T_6$ may be at approximately 80 nanoseconds and time $T_0'$ may be at approximately 100 nanoseconds.

The memory array in accordance with this invention of FIG. 2 utilizes plated wire with the magnetic material oriented parallel to the axis of the wire and with two wires providing an essentially closed magnetic path. The flux path established in the film in each segment of wire by the writing field is continued in the non-magnetic region at the ends of the domains by relatively low reluctance air paths between the complementary magnetic poles of the thin film of each adjacent pair of coated wires. Along the wire 58 of FIG. 2 at one end of the domain 166 the first segment 60 may have a north pole and the second segment 62 may have a south pole with a similar but opposite pattern at the other end of the domain. The film of one air gap can be maintained by the magnetomotive force of the film of one wire segment and that of the other air gap by the magnetomotive force of the film of the other wire. The path between these poles is shorter than would be the path from the one pole of a single wire segment to the other pole of that wire segment through the air. Thus, the retentivity of the film maintains the flux and the small air path in accordance with this invention aids the retention of the magnetic field because of the reduced magnetomotive force required to retain the flux in the air gap. The very great length to cross section ratio of the magnetic films makes variations at the end of the domain regions due to domain wall position variations relatively small.

Another arrangement in accordance with this invention to provide a closure of the magnetic field shown in FIG. 8 may utilize ribbons or conductive material having a flat surface with magnetic material plated on one side or the flat surface. First and second coated conductors 615 and 616 are provided through which the selection or bias current is applied shown by arrows 618 and 620 to develop circumferential or peripheral bias fields shown by arrows 622 and 624. The coated conductors 615 and 616 respectively have a linearly oriented magnetic material 626 and 628 coated to one flat side thereof with insulating material on the other three sides. The direction of orientation is parallel to the longitudinal axis of the coated conductors 615 and 616. For forming the conductors 615 and 616, the plates or strips may be coated with an insulating material such as a synthetic lacquer, and a grinding wheel may be applied to the one flat side before passing the strip through the electro-deposition arrangement of FIG. 1. Thus, the iron and nickel magnetic material is only deposited on the one side. Also in accordance with this invention, the strips 615 and 616 may be formed from a circular insulated wire with one side ground flat before being passed through the electro-deposition tank of FIG. 1. Thus, the thin films 626 and 628 have magnetic elements thereof linearly oriented parallel to the longitudinal axis of the strips 615 and 616.

Write conductors such as 630 and 632 and a sense conductor 636 are provided similar to the arrangement of FIG. 2 to form a domain region 640, which functions as a single binary memory element. The field established in the surfaces 626 and 628 of magnetic material for a binary state such as a "one" is shown by arrows 642, 644, 646 and 648. In order to minimize the air space at the ends of the magnetic region, the flat conductors may be bent together at 652 and 654. Also, the space between the conductors 615 and 616 at the write conductors 630 and 632 and sense conductor 636 may be increased to provide a space between the conductors 630, 632 and 636 and the coated conductors 615 and 616 to minimize capacitance developed thereat. Thus, because the airspace at the ends of the domain is reduced, a highly closed magnetic path is provided. The arrangement of FIG. 8 may have insulated plates on both sides as discussed relatively to FIG. 2. The fields 622 and 624 developed by the bias current of the arrows 618 and 620 are at right angles to the direction of linear orientation of the thin films of magnetic material similar to the circular coated material of FIG. 2. Because the operation of the arrangement of FIG. 8, which may be incorporated into the system of FIG. 2, is similar to the previously discussed operation, it will not be explained in further detail.

Figure 7:
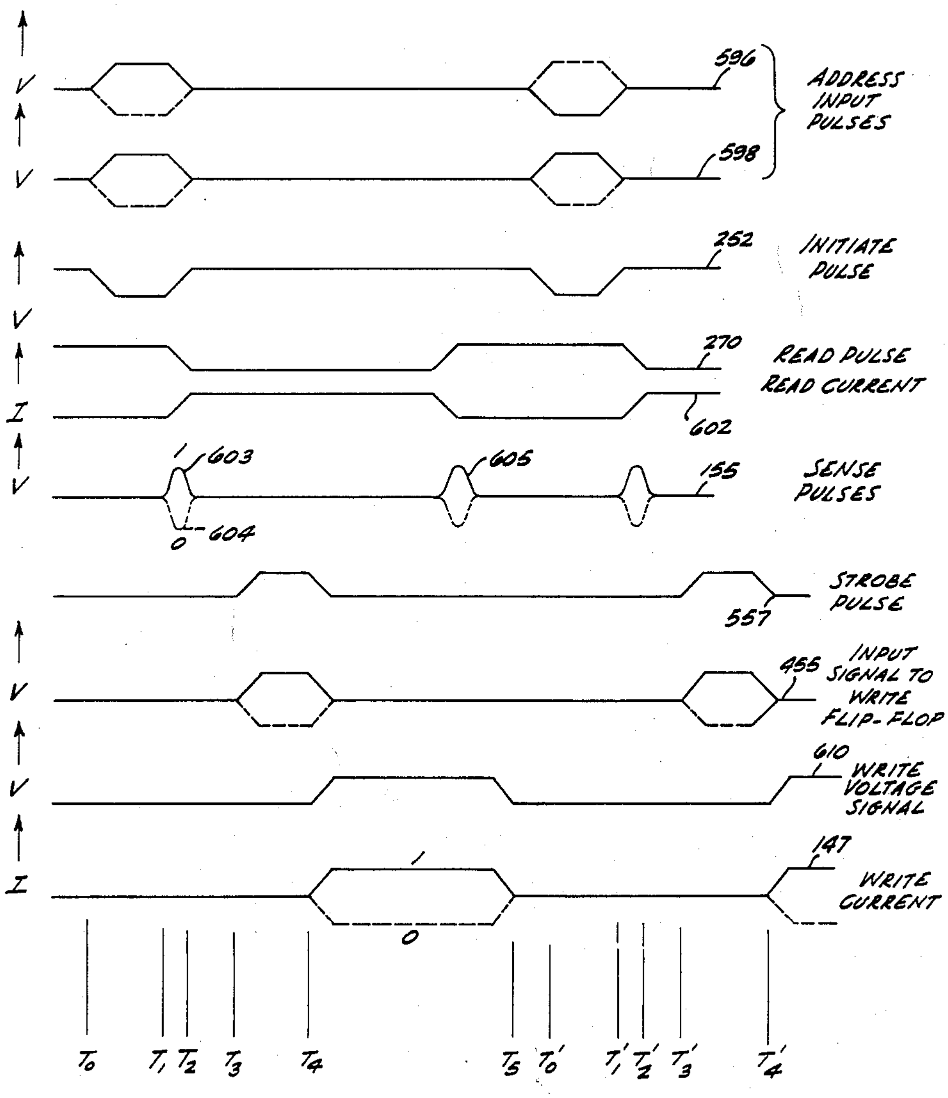
FIG. 7 is a diagram of waveforms for explaining the operation of the memory array of FIG. 2 and the circuits of FIGS. 5 and 6.
Figure 9:
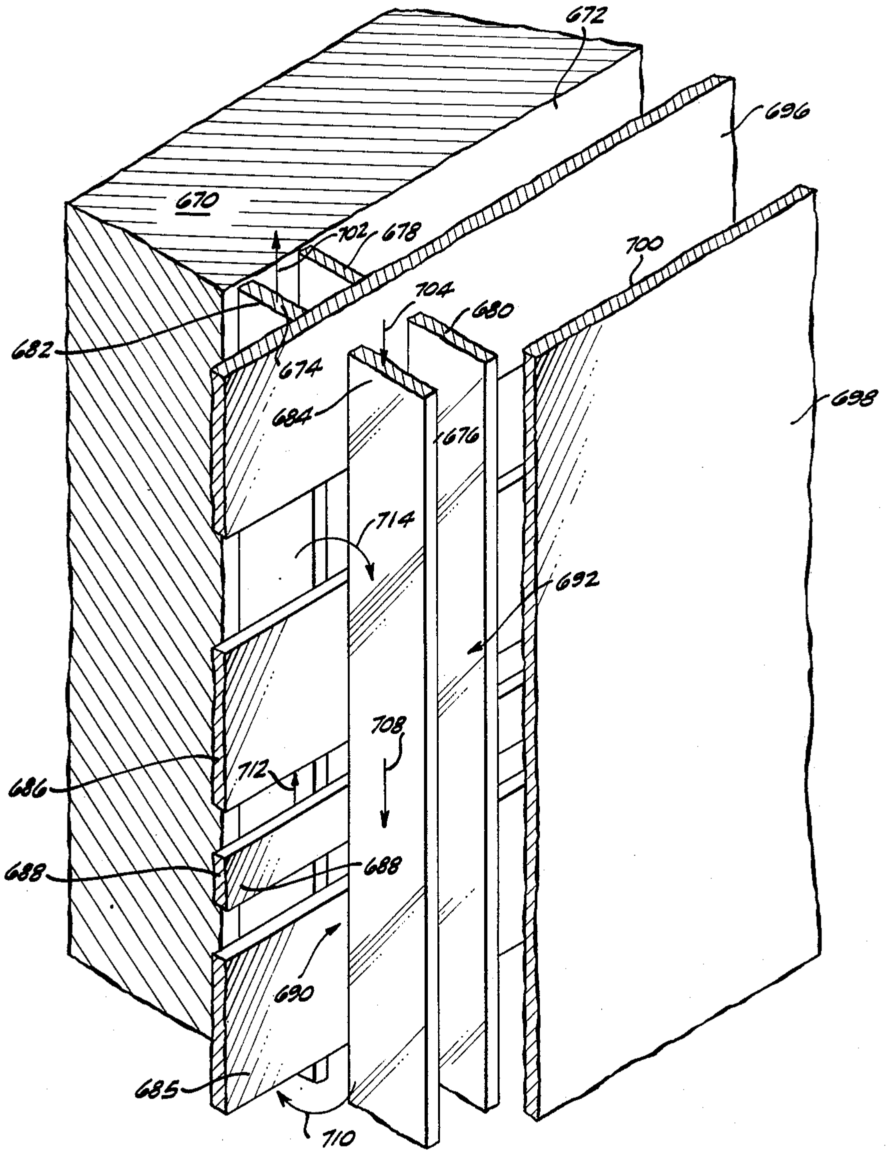
FIG. 9 is a schematic perspective diagram of still another arrangement of the memory elements in accordance with this invention.

Another arrangement in accordance with this invention that provides an increased amplitude to the sense signal of the waveform 155 of FIG. 7 because of increased bulk of magnetic film while maintaining very close spacing of coated storage conductors is shown in FIG. 9. A plate 670 having an insulated surface 672 is provided with coated conductors 674 and 676 and coated conductors 678 and 680 forming respectively a first and a second pair of storage means and positioned adjacent to the plate 670. The conductors such as 674 and 676 have a thin film of magnetic material deposited on all four sides thereof as shown by respective films 682 and 684, with the thin films being linearly oriented parallel to the longitudinal axis of the conductors such as 674 and 676. Positioned between the coated conductors such as 674 and 676 are write conductors 685 and 686 and a sense conductor 688 forming a domain region 690 in the film of the conductors 674 and 676 and a domain region 692 in the film of the conductors 678 and 680. A write conductor 696 is shown included in an adjacent domain region of each of the two words shown. A plate 698 having an anodized surface 700 is also positioned adjacent to the coated conductors such as 676 and 680 to retain the writing field. The coated conductors such as 674 and 676 may be flat strips coated in a linearly oriented field as discussed relative to FIG. 1. The bias current is applied through the conducting portion of the conductors such as 674 and 676 as shown by arrows 702 and 704 to develop a circumferential or peripheral bias field at right angles to the direction of linear orientation of the thin film, the write current is applied through the write conductors such as 685 and 686 and the sense signal is induced in the sense conductor 688. A stored magnetic state may have a polarity shown by arrows 708, 710, 712 and 714. The operation of the arrangement of FIG. 9 is similar to that of FIG. 2 and will not be explained in further detail. The coated conductors such as 674 and 678 are closely spaced along the sense and write conductors with an essentially closed magnetic path. The rectangular strips provide a relatively large cross sectional area of thin film so that the sensed signal in response to a bias current shown by the arrows 702 and 704 is relatively large.

Thus, there has been described an improved memory system in which conductors coated with a thin film of magnetic material linearly oriented parallel to the longitudinal axis of the conductor are arranged as word conductors in pairs so as to provide an essentially closed magnetic path. Write conductors and sense conductors are positioned between the pairs of word conductors and shield plates are positioned on the outside to enclose the magnetic and electrical circuits. These shields so confine the field of the sense and control conductors that even though the conductors may encircle thousands of word wires, the inductance thereof is limited to manageable values. The magnetomotive force or bias force developed by a current pulse passed through the central conductor of the coated wires is circumferential and at right angles to the direction of orientation of the magnetic material and distorts the field in the domain regions of the coated conductors to provide non-destructive reading. The current may flow through the central conductor of the complementary coated wires either in the same direction or different directions for the two coated wires. Writing is performed by passing a write current pulse of a selected polarity through the write conductors to write by rotational switching into the magnetic film of the word wires biased by the bias force. Because the substantially closed magnetic path contains the lines of flux of the stored information, the memory is highly compact, thus providing relatively short conductors. In the system in accordance with this invention, the propagation delay of the conductors may be of the same order of magnitude as the switching time of the thin films. Thus, the memory in accordance with this invention provides a high speed, simplified memory because of the closed magnetic path and the short conductors required in the compact arrangement.

What is claimed is:

1. A memory element comprising a first conductor having a thin film of magnetic material thereon, a second conductor having a thin film of magnetic material thereon and positioned adjacent and parallel to said first conductor, write conducting means positioned between said first and second conductors at substantially right angles thereto, sense conducting means positioned between said first and second conducting means at substantially right angles thereto and adjacent to said write conducting means, whereby a magnetic domain having a magnetic state of a selected polarity is established in a continuous magnetic path through said thin films of said first and second conductors and through the space therebetween at the ends of said domain in response to current flowing through said write conducting means in a selected direction coincident with a current flowing through said first and second conductors in either direction, and a signal representative of the selected polarity is induced in said sense conducting means in response to the current flowing through said first and second conductors in either direction.

2. A memory element comprising a first conductor coated with a thin film of magnetic material, a second conductor coated with a thin film of magnetic material and positioned substantially adjacent and parallel to said first conductor, said first and second conductors each having a longitudinal axis, said thin film of each of said first and second conductors having magnetic dipole elements thereof oriented parallel to the axis thereof, write conducting means positioned between said first and second conductors at substantially right angles thereto, sense conducting means positioned between said first and second conducting means at substantially right angles thereto and adjacent to said write conducting means, whereby a magnetic domain of a selected polarity is established in said thin films of said first and second conductors in response to current flowing through said write conducting means in a selected direction coincident with a current flowing through said first and second conductors, and a signal representative of the selected polarity is induced in said sense conducting means in response to the current flowing through said first and second conductors.

3. A memory element comprising a first conductor having a thin film of magnetic material thereon, a second conductor having a thin film of magnetic material thereon and positioned adjacent and parallel to said first conductor, said first and second conductors each having a longitudinal axis, said thin film of each of said first and second conductors having magnetic elements thereof oriented substantially parallel to the axis thereof, write conducting means positioned between said first and second conductors at substantially right angles thereto, sense conducting means positioned between said first and second conducting means at substantially right angles thereto and adjacent to said write conducting means, a source of bias pulses coupled to said first and second conductors, and a source of write pulses coupled to said write conducting means, whereby a magnetic domain region having a magnetic state of a selected polarity is established with an essentially closed internal magnetic path through the thin films of said first and second conductors and through the airspace at the ends of said domain regions in response to a write pulse developing a field at said films in the presence of a bias pulse developing a bias field at said films being at right angles to the direction of orientation, and a signal representative of the stored magnetic state is induced in said sense conducting means in response to only said bias pulse being applied to said first and second conductors to develop said bias field with the film returning to the stored magnetic state at the termination of said bias pulse.

4. A memory element comprising first and second circular conductors coated with thin films of magnetic material, said thin films of each of said first and second conductors having magnetic elements thereof oriented substantially parallel to the longitudinal axis of the corresponding conductor, said first and second conductors arranged parallel to each other, a source of bias current coupled to said first and second conductors to apply a circumferential bias field to said thin film of magnetic material substantially at right angles to the direction of orientation, and a write conductor positioned between and at substantially right angles to the axis of the first and second conductors to apply a switching field thereto and achieve rotational magnetic switching in the presence of said bias field.

5. A memory element comprising first and second circular conducting wires positioned parallel and adjacent to each other, each wire coated with a thin film of magnetic material having magnetic elements thereof oriented substantially parallel to the longitudinal axis of said wires, said first and second wires forming a magnetic domain region having a magnetic state with opposite magnetic poles of said first and second wires adjacent to each other at each end of said domain region and with a magnetic field having an essentially closed magnetic path through the thin films of said first and second wires, a source of bias current coupled to said first and second wires to apply circumferential bias fields to said magnetic material substantially at right angles to the direction of orientation and a write conductor positioned at substantially right angles to the axis of the coated wires and therebetween to provide a switching field to achieve rotational magnetic switching in the presence of said bias field.

6. A memory element comprising a first and a second circular wire each coated with a thin film of magnetic material having magnetic elements thereof oriented parallel to the longitudinal axis of said circular wire, a source of bias current coupled to said circular wires to apply a circumferential bias field to said magnetic material substantially at right angles to the direction of orientation, a write conductor positioned at substantially right angles to the axis of the coated conductor, a source of write current coupled to said write conductor to provide a switching field to achieve rotational magnetic switching in the presence of said bias field and to establish a magnetic domain region with opposite magnetic poles in the thin film of said first and second wires at each end of said domain region so as to provide an essentially closed internal magnetic path, and a sense conductor positioned between said first and second wires at right angles to the axis thereof and in said domain region, said bias current inducing a signal in said sense conductor representative of a magnetic state of said domain region without permanently changing the magnetic state.

7. A memory structure comprising first and second conductors each having a longitudinal axis, said first and second conductors positioned adjacent to each other and each coated with a thin film of magnetic material having magnetic elements thereof substantially oriented parallel to the axis of the respective conductor, write conductor means positioned between said first and second coated wires substantially at right angles to the axis thereof, sense conductor means positioned between said first and second wires substantially at right angles to the axis thereof and adjacent to said write conductor means, a source of bias current coupled to said first and second conductors for passing a bias current therethrough to develop a bias field at right angles to the direction of orientation, and a source of write current pulses coupled to said write conductor means to apply a switching field to said thin films, said switching field being applied to said thin films in the presence of said bias field to establish a stored magnetic state having an essentially internal closed magnetic path through the films of said first and second conductors, said bias field being applied separately to decrease the flux density of the magnetic field linking said sense conductor means to induce a signal on said sense conductor means having a polarity representative of the stored magnetic state.

8. A memory element comprising first and second conducting wires each having an axis and each coated with a thin film of magnetic material having magnetic elements therein substantially oriented parallel to the respective axis of said first and second wires, said first and second wires positioned adjacent to and substantially parallel to each other, a write conductor positioned between said first and second wires and substantially at right angles to the axis thereof, a sense conductor positioned between said first and second wires substantially at right angles to the axis thereof and adjacent to said write conductor, means coupled to said first and second conductors to apply a bias current to said first and second conductors, means coupled to said write conductor to apply a write current to said write conductor, and means coupled to said sense conductor to respond to a sense signal induced thereon, said first and second conductors developing a bias field at right angles to the direction of orientation in response to said bias current to induce a sense signal in said sense conductor representative of a binary magnetic state stored in the films of said first and second conductors, and said writing conductor responding to said write current to develop a switching field which in the presence of said bias field switches said stored magnetic state to an opposite state by rotational switching.

9. A memory element comprising first and second conductors each having a longitudinal axis and coated with a thin film of magnetic material said first and second conductors positioned substantially adjacent to each other and each having an axis substantially parallel to each other, said magnetic material having oriented magnetic elements therein substantially aligned parallel to said axis of the corresponding first and second conductors, second and third conductors positioned between said first and second conductors at substantially right angles to the axis thereof, a sense conductor positioned between said first and second conductors at substantially right angles thereto and positioned between said third and fourth conductors, bias means coupled to said first and second conductors for providing a bias field at substantially right angles to said direction of orientation, switching means coupled to said third and fourth conductors for providing a switching pulse to develop in the presence of said bias field a selected magnetic state in the thin film coating along a length of said first and second conductor substantially adjacent to said third and fourth conductors, said first and second conductors having an opposite polarity relation at each end of said length thereof having the selected magnetic state to provide a substantially closed magnetic path through said films of said first and second conductors, and sensing means coupled to said sense conductor for responding to a sense signal induced in said sense conductor in response to the application of said bias field.

10. A random access memory comprising a mounting surface, a plurality of pairs of inner and outer circular conducting wires each having a longitudinal axis and positioned adjacent and parallel to each other with said plurality of pairs positioned in parallel adjacent to said mounting surface, each of said inner and outer wires coated with a thin film of magnetic material having magnetic elements thereof linearly oriented parallel to the axis thereof, a plurality of write conducting means each wound between said inner and outer wires of each of said plurality of pairs at a different position along the lengths thereof to establish a plurality of magnetic domains in the thin films of each pair of inner and outer wires with the thin film of said inner and outer wires having an opposite magnetic polarity relation at each end of each domain, each magnetic domain having a first or a second magnetic state with an essentially closed magnetic path through the films of said inner and outer wires and between the films at the ends of said domains, a plurality of sense conductors each wound between said inner and outer wires at a magnetic domain in each pair, a source of bias current coupled to each of said inner and outer wires for passing a bias current through a selected pair of inner and outer wires to develop a circumferential bias field to change the stored magnetic state to induce a sense signal in said plurality of sense conductors having a polarity representative of the stored magnetic state, said magnetic domains returning to said stored magnetic state at the termination of said bias current, and a source of write current pulses coupled to said plurality of write conductor means for applying write current pulses of a selected polarity through said write conductors for developing a switching field to change the stored magnetic state by rotational switching in each magnetic domain in a selected pair of inner and outer wires having a bias current passing thereto, whereby said magnetic field is retained in the effectively closed magnetic path, said stored magnetic state is non-destructively sensed in response to said bias current, and said magnetic state is changed by rotational switching in response to said switching field in the presence of said circumferential field.

References Cited in the file of this patent

UNITED STATES PATENTS 2,792,563 Rajchman ............ May 14, 1957